United States Patent Office 2,963,481
Patented Dec. 6, 1960

2,963,481

6-PTERIDINECARBOXYLIC ACID ESTERS

June Grannells, Philadelphia, and Joseph Weinstock, Phoenixville, Pa., assignors to Smith Kline & French Laboratories, Philadelphia, Pa., a corporation of Pennsylvania No Drawing. Filed Nov. 27, 1959, Ser. No. 855,490

5 Claims. (Cl. 260—251.5)

This invention relates to new 6-pteridinecarboxylic acid esters having utility as intermediates for the preparation of potent diuretic and natriuretic compounds.

More specifically the 6-pteridinecarboxylic acid esters of this invention are valuable intermediates in the preparation of potent diuretic compounds, such as the corresponding 6-pteridinecarboxamide derivatives and the 6-pteridinecarboxylic acid hydrazide derivatives. In addition the 6-pteridinecarboxylic acid esters have diuretic activity in their own right.

The novel 6-pteridinecarboxylic acid esters of this invention are represented by the following structural formula:

FORMULA I

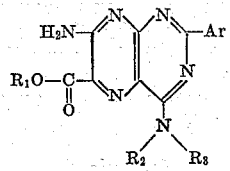

when:

Ar represents phenyl, chlorophenyl, tolyl methoxyphenyl, $\alpha,\alpha,\alpha$ - trifluorotolyl, hydroxyphenyl, aminophenyl, thienyl or pyridyl;

$R_1$ represents lower alkyl or phenyl; and $R_2$ and $R_3$ represent hydrogen or lower alkyl.

Advantageous compounds of this invention are represented by the following structural formula:

FORMULA II

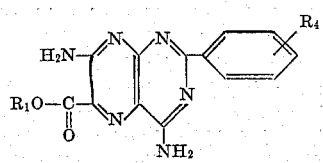

when:

$R_1$ represents lower alkyl and $R_4$ represents hydrogen, chloro, methyl, methoxy, hydroxy, amino or trifluoromethyl.

The preferred and advantageous compounds of this invention are represented by Formula II when $R_1$ represents lower alkyl and $R_4$ represents hydrogen.

By the term "lower alkyl" where used herein saturated aliphatic groups having a maximum of 4 carbon atoms are indicated.

The compounds of this invention are prepared by reacting a 4,6-diamino-2-aryl-5-nitrosopyrimidine with a cyanoacetic acid ester, usually in excess, in a suitable organic solvent in which the reactants are substantially soluble such as a lower alcohol, for example methanol, ethanol or isopropanol, or dimethylformamide. The reaction is usually carried out in the presence of a basic adjuvant such as an alkali metal alkoxide such as a potassium or sodium alkoxide, preferably in excess. The reaction mixture is heated conveniently at temperatures of from about 50° C. to about 200° C., preferably at reflux temperature for about 15 minutes to 2 hours.

Longer reaction periods are of no particular advantage. Isolation of the 6-pteridinecarboxylic acid esters of this invention is accomplished by filtration of the reaction mixture. The esters are purified by extraction with hot-water and recrystallization of the residue from a suitable solvent such as dimethylformamide. The aqueous extract contains a diuretically active material, 4-amino-7-hydroxy-2-phenyl-6-pteridinecarboxamide.

The 4-unsubstituted amino-6-amino-2-aryl-5-nitrosopyrimidine intermediates are prepared by the reaction of an amidine hydrohalide such as hydrochloride or hydrobromide with, preferably, a slight excess of the silver salt of isonitrosomalononitrile in a lower alcohol solvent, such as methanol or ethanol, and the thermal cyclization of the resulting amidine salt in an organic solvent such as, for example, 5-ethyl-2-methylpyridine, 2- or 3-picoline, pyridine or quinoline or in mixtures of these solvents. The cyclization is conveniently carried out by heating the reaction mixture at reflux temperature for about 5 to about 60 minutes. A ratio of one gram of amidine salt to about five grams of solvent is advantageous.

The 4 - alkylamine - 6 - amino - 2 - aryl - 5 - nitrosopyrimidine intermediates are prepared by condensing an amidine hydrohalide, such as preferably hydrochloride or hydrobromide, with, preferably, a slight excess of ethyl cyanoacetate in a lower alcohol solvent such as ethanol or methanol in the presence of an alkali metal alkoxide, for example sodium methoxide, sodium ethoxide or potassium ethoxide. The reactants are heated conveniently at the reflux temperature of the solvent for approximately three to six hours. Working up the reaction mixture by evaporating the solvent, adding water to the residue, cooling and isolating the precipitate by filtration gives the 6-amino-2-aryl-4-pyrimidol. Treatment of this pyrimidol with a chlorinating agent such as phosphorus pentachloride, thionyl chloride or, preferably, phosphorus oxychloride advantageously in the presence of an acid-binding agent such as dimethylaniline or pyridine gives 6-amino-2-aryl-4-chloropyrimidine. Reaction of this chloropyrimidine with at least an equivalent amount of alkylamine in aqueous solution yields 4-alkylamino-6-amino-2-arylpyrimidine. Treatment of this 4-alkylamino-6-amino-2-arylpyrimidine in acid solution with at least an equivalent amount of sodium nitrite at about +5° to −5° C. gives the 4-alkylamino-6-amino-2-aryl-5-nitrosopyrimidine intermediate.

The amidine hydrohalide starting materials, having substituents in the meta or para positions, are conveniently prepared by passing dry hydrogen chloride into a lower alcohol solution, preferably methanol or ethanol, of the appropriate benzonitrile. The resulting solution is allowed to stand at room temperature while it sets to a solid cake which is then treated with an excess of dry ammonia in absolute alcohol, such as methanol or ethanol. The reaction mixture is shaken for about 10 to 20 hours then allowed to stand for about 48 hours. The mixture is worked up by filtering, evaporating to dryness, dissolving the residue in water and acidifying with concentrated hydrohalic acid, for example hydrochloric or hydrobromic acid, concentrating and filtering the amidine hydrohalide.

The o-substituted amidine hydrohalide starting materials are conveniently prepared by treatment of the o-substituted benzonitrile with, preferably, a slight excess of hydroxylamine hydrochloride in lower alcohol solution, such as ethanol or methanol, in the presence of an alkali metal alkoxide such as sodium or potassium alkoxide, for example, sodium ethoxide or potassium methoxide. The reactants are heated conveniently at the reflux temperature of the solvent for about six to ten hours and the mixture worked up to give the o-substituted benzamidoxime which is hydrogenated in lower alcohol solution, such as methanol or ethanol, using a hydrogenation catalyst such as Raney nickel at about 60° to 70° C. until the theoretical amount of hydrogen is taken up. The alcohol solution is filtered, evaporated to dryness and the residue dissolved in hot alcohol such as methanol or ethanol. Cooling the solution and treating with hydrogen halide causes precipitation of the o-substituted amidine hydrohalide.

The cyanoacetic acid ester intermediates are either known to the art or are prepared by refluxing cyanoacetic acid with the appropriate alcohol in the presence of an acidic catalyst. The phenyl ester is conveniently prepared by reacting phenol with cyanoacetyl chloride in the presence of an organic base such as pyridine or dimethylaniline.

The 4,7-diamino-2-aryl-6-pteridinecarboxylic acid esters of this invention are intermediates for the preparation of potent diuretics of the following formula:

FORMULA III

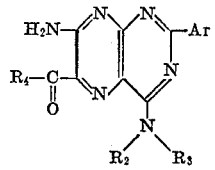

in which Ar, $R_2$ and $R_3$ are as previously defined; $R_4$ is

or —NHNHR$_7$; $R_5$ and $R_6$ are hydrogen, lower alkyl, ω-hydroxy-lower alkylene, ω-acetoxy-lower alkylene, ω-chloro-lower alkylene or ω-amino-lower alkylene; and $R_7$ is hydrogen or lower alkyl.

These compounds are prepared by treating the intermediate 6-pteridinecarboxylic acid ester with an amine having the formula

or a hydrazine having the formula H$_2$NNHR$_7$, $R_5$, $R_6$ and $R_7$ being as defined above. The reaction is preferably carried out in a polar organic solvent having less than 6 carbon atoms in which the reactants are substantially soluble and with which no chemical reaction occurs, such as a lower alkoxy-lower alkyl alcohol, for example ethoxyethanol or methoxyethanol, a lower alkylene glycol, for example, ethylene glycol or propylene glycol or a lower alkyl alcohol such as ethanol or isopropanol at elevated temperature such as from about 70° C. to about 200° C., preferably from about 90° C. to 150° C. for about 10 minutes to 8 hours. The resulting 6-pteridinecarboxamide derivatives and 6-pteridinecarboxylic acid hydrazide derivatives are isolated by filtration from the reaction mixture. Reaction conditions other than those outlined hereabove may be used but have little further advantage.

The following examples are not limiting but are illustrative of compounds of this invention and will serve to make fully apparent all of the compounds embraced by the general formulas given above.

*Example 1*

To a boiling solution of 6.45 g. of 4,6-diamino-2-phenyl-5-nitrosopyrimidine in 400 ml. of methanol is added 2.94 ml. of methyl cyanoacetate and then 1.78 g. of sodium methoxide. The resulting mixture is refluxed for one hour. Yellow crystals are collected by filtration of the hot mixture and extracted with 300 ml. of boiling water. Recrystallization from dimethylformamide yields yellow crystals of methyl 4,7-diamino-2-phenyl-6-pteridinecarboxylate, M.P. about 286° C.

*Example 2*

A refluxing solution of 6.45 g. of 4,6-diamino-2-phenyl-5-nitrosopyrimidine in 400 ml. of ethanol is treated with 3.3 g. of ethyl cyanoacetate and then with 2.2 g. of sodium ethoxide. The resulting mixture is refluxed for one hour and filtered hot. The crystals thus obtained are washed with hot water and recrystallized from aqueous dimethylformamide to give ethyl 4,7-diamino-2-phenyl-6-pteridinecarboxylate, M.P. 290° C.

Evaporation of the aqueous extract leaves, as the residue, the sodium salt of 4-amino-7-hydroxy-2-phenyl-6-pteridinecarboxamide. The sodium salt is dissolved in water and treated with an equivalent amount of hydrochloric acid. Filtration of the precipitate and recrystallization from dimethylformamide gives 4-amino-7-hydroxy-2-phenyl-6-pteridinecarboxamide.

*Example 3*

A mixture of 7.0 g. of cyanoacetic acid, 150 ml. of isopropanol and 1 ml. of concentrated sulfuric acid is refluxed for three hours. The solution is concentrated in vacuo, then washed with concentrated aqueous sodium carbonate and distilled to give isopropyl cyanoacetate.

To a refluxing solution of 6.45 g. of 4,6-diamino-2-phenyl-5-nitrosopyrimidine in 450 ml. of isopropanol is added 3.7 g. of isopropyl cyanoacetate and 1.78 g. of sodium methoxide. Refluxing the resulting mixture for 90 minutes, filtering off the crystalline material and washing it with hot water and recrystallizing from dimethylformamide gives isopropyl 4,7-diamino-2-phenyl-6-pteridinecarboxylate.

*Example 4*

To a refluxing solution of 4.3 g. of 4,6-diamino-2-phenyl-5-nitrosopyrimidine in 450 ml. of t-butanol is added 3.0 g. of t-butyl cyanoacetate and 1.2 g. of sodium methoxide and the resulting solution is heated at reflux for one hour. Filtering off the solid material, washing it with hot water and recrystallizing from dimethylformamide gives t-butyl 4,7-diamino-2-phenyl-6-pteridinecarboxylate.

*Example 5*

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A refluxing solution of 7.8 g. of the above prepared pyrimidine in 500 ml. of methanol is treated with 2.8 g. of methyl cyanoacetate and 1.78 g. of sodium methoxide, then refluxed for one hour. Working up as in Example 4 yields methyl 4,7-diamino-2-(p-chlorophenyl)-6-pteridinecarboxylate.

*Example 6*

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methyl-pyridine. The solution is cooled, diluted with ethanol and filtered. The dark green solid obtained is 4,6-diamino-2-(p-methoxyphenyl)-5-nitrosopyrimidine, M.P. 278° C. (dec.).

Treatment of a methanol solution of the above prepared pyrimidine with methyl cyanoacetate and sodium methoxide as in Example 1 gives methyl 4,7-diamino-2-(p-methoxyphenyl)-6-pteridinecarboxylate.

Example 7

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in absolute ethanol containing 12 g. of ammonia. The reaction mixture is shaken for 24 hours, allowed to stand for 48 hours and filtered. The filtrate is allowed to evaporate to dryness in the open air. The residue is dissolved in water. The aqueout solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalononitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(3′-thienyl)-pyrimidine.

To a refluxing solution of 4.4 g. of 4,6-diamino-5-nitro-2-(3′-thienyl)-pyrimidine in 300 ml. of methanol is added 1.9 g. of methyl cyanoacetate and 1.2 g. of sodium methoxide. The resulting solution is refluxed for one hour. The hot solution is filtered. The solid material is extracted with hot water and recrystallized from dimethylformamide to give methyl 4,7-diamino-2-(3′-thienyl)-6-pteridinecarboxylate.

Example 8

Treatment of 54.5 g. of 2-thiophenecarbonitrile in ethanol solution with dry hydrogen chloride and subsequently with an ethanolic solution of ammonia and working up as in Example 7 yields 2-thiophenecarboxamidine hydrochloride.

The above-prepared hydrochloride (4.0 g.) is reacted with 5.6 g. of the silver salt of isonitrosomalononitrile in methanol solution and cyclized by subsequent refluxing with 35 ml. of 5-ethyl-2-methylpyridine as in Example 7 to give 4,6-diamino-5-nitroso-2-(2′-thienyl)-pyrimidine.

This pyrimidine (4.4 g.) in 350 ml. of refluxing n-propanol is treated with 2.5 g. of n-propyl cyanoacetate (prepared by refluxing cyanoacetic acid with n-propanol and concentrated sulfuric acid and working up as in Example 3) and 1.2 g. of sodium methoxide. The mixture is refluxed for one hour. Crystals are filtered from the hot solution, extracted with hot water and recrystallized from dimethylformamide to give n-propyl-4,7-diamino-2-(2′-thienyl)-6-pteridinecarboxylate.

Example 9

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as in Example 6 to give 4,6-diamino-5-nitroso-2-(m-tolyl)-pyrimidine.

Sodium methoxide (1.78 g.) is added to a refluxing solution of 6.87 g. of 4,6-diamino-5-nitroso-2-(m-tolyl)-pyrimidine and 2.8 g. of methyl cyanoacetate in 400 ml. of methanol. The resulting mixture is refluxed for 45 minutes. Crystals are collected by filtering the hot mixture. Washing with hot water and recrystallizing from dimethylformamide gives methyl 4,7-diamino-2-(m-tolyl)-6-pteridinecarboxylate.

Example 10

To a stirred solution of 5.0 g. of o-nitrobenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-3-methylpyridine, cooled and treated with 50 ml. of ethanol. Collection of the solid material by filtration gives 4,6-diamino-2-(o-nitrophenyl)-5-nitrosopyrimidine.

Adding 2.2 g. of ethyl cyanoacetate, then 1.5 g. of sodium ethoxide to a refluxing solution of 5.2 g. of 2-(o-nitrophenyl)-5-nitrosopyrimidine in 300 ml. of ethanol, refluxing the resulting mixture for one hour and working up as in Example 9 yields ethyl 4,7-diamino-2-(o-nitrophenyl)-6-pteridinecarboxylate.

Example 11

To a solution of 8.5 g. of m-aminobenzamidine hydrochloride in 150 ml. of methanol is added slowly 11.1 g. of the silver salt of isonitrosomalononitrile. The resulting mixture is stirred for one hour and filtered. The filtrate is evaporated in vacuo at 30–35° C. The residue is refluxed with a solution of 5-ethyl-2-methylpyridine (100 ml.) and 2-picoline (50 ml.) for 20 minutes. The mixture is cooled and diluted with water and ethanol. The precipitate is isolated by filtration and washed with ethanol to give a dark green solid, 4,6-diamino-2-(m-aminophenyl)-5-nitrosopyrimidine.

Treatment of this pyrimidine in methanol solution with methyl cyanoacetate and sodium methoxide and working up as in Example 9 gives methyl 4,7-diamino-2-(m-aminophenyl)-6-pteridinecarboxylate.

Example 12

Treatment of 22.0 g. of α,α,α-trifluoro-p-tolunitrile in ethanol solution with dry hydrogen chloride and then with ethanolic ammonia and working up as in Example 7 gives α,α,α-trifluorotoluamidine hydrochloride.

This hydrochloride is reacted with the silver salt of isonitrosomalononitrile in methanol solution and cyclized by refluxing with 5-ethyl-2-methylpyridine as in Example 7 to give 4,6-diamino-5-nitroso-2-(α,α,α-trifluoro-p-tolyl)-pyrimidine.

To a refluxing solution of 5.6 g. of the above prepared pyrimidine in 250 ml. of methanol is added 1.8 g. of methyl cyanoacetate and 1.2 g. of sodium methoxide. The resulting mixture is heated at reflux for one hour. The hot mixture is filtered and the crystals obtained are washed with hot water and recrystallized from dimethylformamide to give methyl 4,7-diamino-2-(α,α,α-trifluoro-p-tolyl)-6-pteridinecarboxylate.

Example 13

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenylpyrimidine.

Ten grams of 6-amino-4-chloro-2-phenylpyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methylamino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine.

Sodium methoxide (1.2 g.) is added to a refluxing methanol solution of 4.6 g. of 6-amino-4-methylamino-5-nitroso-2-phenylpyrimidine and 1.8 g. of methyl cyanoacetate. The resulting mixture is refluxed for one hour. Working up as in Example 12 gives methyl 7-amino-4-methylamino-2-phenylpteridinecarboxylate.

Example 14

A mixture of 8.0 g. of 6-amino-4-chloro-2-phenylpyrimidine, prepared as in Example 13, and 30 ml. of 25% aqueous dimethylamine is heated in a bomb at 125° C. for four hours. 6-amino-4-dimethylamino-2-phenylpyrimidine is isolated from the mixture by filtration.

Ten grams of 6-amino-4-dimethylamino-2-phenylpyrimidine and 150 ml. of 10% acetic acid are heated at 90° C. and filtered. The mixture is cooled to 0° C. A solution of 4.0 g. of sodium nitrite in 10 ml. of water is added portionwise and the resulting mixture allowed to stand for one hour at 0° C. and one hour at room temperature. The precipitate is filtered off, washed with water and dried to give 6-amino-4-dimethylamino-5-nitroso-2-phenylpyrimidine.

Treatment of the above prepared nitrosopyrimidine (4.8 g.) in refluxing methanol solution with 1.8 g. of methyl cyanoacetate and 1.2 g. of sodium methoxide and working up as in Example 12 gives methyl 7-amino-4-dimethylamino-2-phenylpteridinecarboxylate.

Example 15

The silver salt of isonitrosomalononitrile (11.1 g.) is added to a solution of 7.8 g. of isonicotinamidine hydrochloride in 100 ml. of methanol and the resulting mixture is stirred for 30 minutes and filtered. The filtrate is evaporated to dryness in vacuo at 30–35° C. The residue is refluxed with 100 ml. of 5-ethyl-2-methylpyridine for ten minutes. Addition of water and ethanol and filtration of the solid gives 4,6-diamino-5-nitroso-2-(4'-pyridyl)-pyrimidine.

Methyl cyanoacetate (2.8 g.) and sodium methoxide (1.78 g.) are added to a boiling solution of 6.45 g. of 4,6-diamino-5-nitroso-2-(4'-pyridyl)-pyrimidine in 400 ml. of methanol. Refluxing the resulting mixture for 30 minutes, filtering off the crystals, extracting with hot water, and recrystallizing from dimethylformamide gives methyl 4,7-diamino-2-(4'pyridyl)-6-pteridinecarboxylate.

Example 16

A mixture of 8.9 g. of cyanoacetyl chloride, 11.6 g. of sodium phenolate and 75 ml. of pyridine is heated on a steam bath for one hour. Evaporating the mixture and distilling the residue gives phenyl cyanoacetate.

To a boiling solution of 6.45 g. of 4,6-diamino-2-phenyl-5-nitrosopyrimidine in 450 ml. of methanol is added 4.9 g. of phenyl cyanoacetate and subsequently 1.78 g. of sodium methoxide. The mixture is refluxed for 30 minutes. Crystals are isolated from the reaction mixture by filtration. Washing with hot water and recrystallizing from dimethylformamide gives phenyl 4,7-diamino-2-phenyl-6-pteridinecarboxylate.

Example 17

Ten grams of 6-amino-4-chloro-2-phenyl-pyrimidine, made as in Example 13, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C. and one hour at room temperature and the precipitated 6-amino-4-dibutylamino-5-nitroso-2-phenylpyrimidine is removed by filtration.

To a refluxing solution of 9.8 g. of 6-amino-4-dibutylamino-5-nitroso-2-phenylpyrimidine in 500 ml. of ethanol is added 3.3 g. of ethyl cyanoacetate, then 2.2 g. of sodium ethoxide. The resulting mixture is refluxed for one hour. Crystals are collected by filtration, washed with hot water and recrystallized from dimethylformamide to give ethyl 7-amino-4-dibutylamino-2-phenyl-6-pteridinecarboxylate.

Example 18

To a stirred solution of 4.3 g. of m-hydroxybenzamidine hydrochloride in 100 ml. of ethanol is added slowly 5.55 g. of the silver salt of isonitrosomalononitrile. The resulting mixture is stirred for one hour and filtered. The filtrate is evaporated to dryness and the residue is refluxed for ten minutes with 50 ml. of 5-ethyl-2-methylpyridine, then treated with 50 ml. of ethanol. Collection of the solid material by filtration gives 4,6-diamino-2-(m-hydroxyphenyl)-5-nitrosopyrimidine.

Treatment of the above prepared pyrimidine (2.3 g.) in refluxing methanol solution with 0.93 g. of methyl cyanoacetate and 0.59 g. of sodium methoxide and working up as in Example 17 gives methyl 4,7-diamino-2-(m-hydroxyphenyl)-6-pteridinecarboxylate.

Example 19

Ammonia is bubbled through a refluxing mixture of 2.5 g. of ethyl 4,7-diamino-2-phenyl-6-pteridinecarboxylate, prepared as in Example 2, in 250 ml. of 2-ethoxyethanol for four hours. Cooling, filtering off the solid and recrystallizing it from aqueous dimethylformamide gives 4,7-diamino-2-phenyl-6-pteridinecarboxamide.

Example 20

Dimethylamine is bubbled through a refluxing mixture of 2.0 g. of methyl 4,7-diamino-2-phenyl-6-pteridinecarboxylate, prepared as in Example 1, in 200 ml. of 2-ethoxyethanol for 4.5 hours. After cooling, the solid is filtered and recrystallized from aqueous dimethylformamide to give 4,7-diamino-N,N-dimethyl-2-phenyl-6-pteridinecarboxamide.

Example 21

A mixture of 2.0 g. of methyl 4,7-diamino-2-phenyl-6-pteridinecarboxylate, made as in Example 1, in 200 ml. of ethylene glycol is treated with 4.5 g. of hydrazine. The resulting mixture is heated at 150–160° C. for 30 minutes. Cooling, diluting with water, filtering off the solid and recrystallizing from aqueous dimethylformamide gives 4,7-diamino-2-phenyl-6-pteridinecarboxylic acid hydrazide.

Example 22

Methylhydrazine (5.0 g.) is added to a refluxing solution of 3.0 g. of methyl 4,7-diamino-2-phenyl-6-pteridinecarboxylate, made as in Example 1, in 300 ml. of 2-ethoxyethanol. The resulting mixture is refluxed for 10 minutes. Cooling, then filtering and recrystallizing the precipitate from aqueous dimethylformamide gives a mixture of 4,7-diamino-2-phenyl-6-pteridinecarboxylic acid 2-methylhydrazide and the corresponding 1-methylhydrazide.

What is claimed is:
1. A chemical compound having the following fundamental formula:

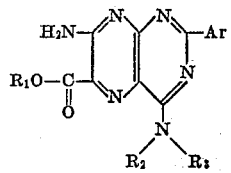

in which Ar is a member selected from the group consisting of phenyl, chlorophenyl, tolyl, methoxyphenyl, $\alpha,\alpha,\alpha$-trifluorotolyl, hydroxyphenyl, aminophenyl, thienyl and pyridyl; $R_1$ is a member selected from the group consisting of lower alkyl and phenyl; and $R_2$ and $R_3$ are members selected from the group consisting of hydrogen and lower alkyl.

2. Lower alkyl 4,7-diamino-2-phenyl-6-pteridinecarboxylate.

3. Methyl 4,7-diamino-2-phenyl-6-pteridinecarboxylate.

4. Ethyl 4,7-diamino-2-phenyl-6-pteridinecarboxylate.

5. Isopropyl 4,7-diamino-2-phenyl-6-pteridinecarboxylate.

References Cited in the file of this patent

Osdene et al.: J. Chem. Soc. (London), 1955, pages 2036–8.